Sept. 16, 1930. F. R. KUNATH 1,776,035
COVER FOR CULINARY UTENSILS
Filed March 6, 1930
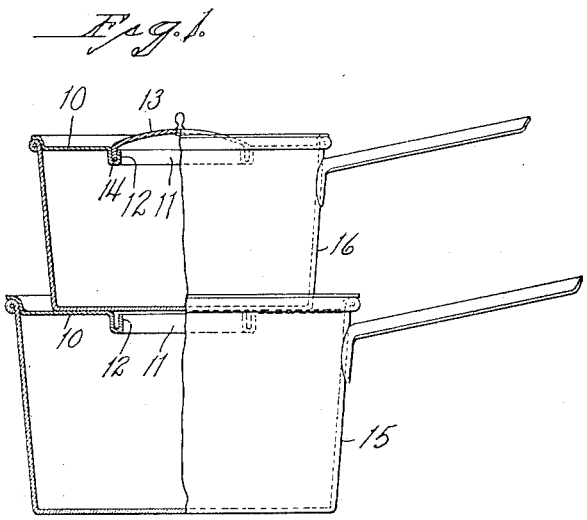
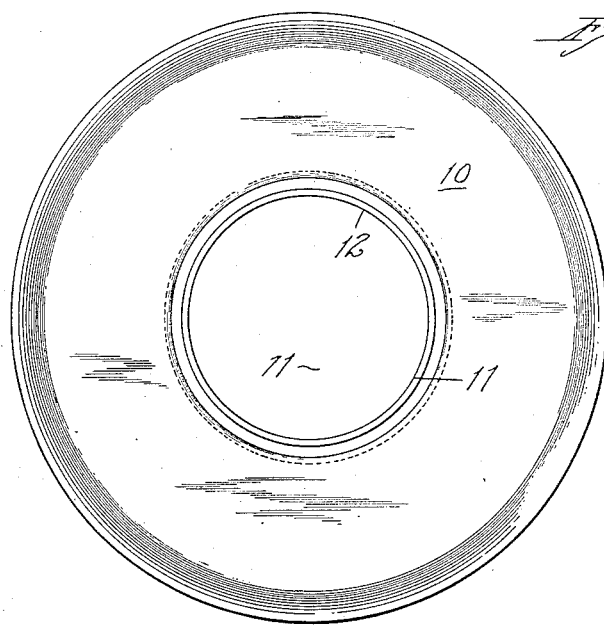
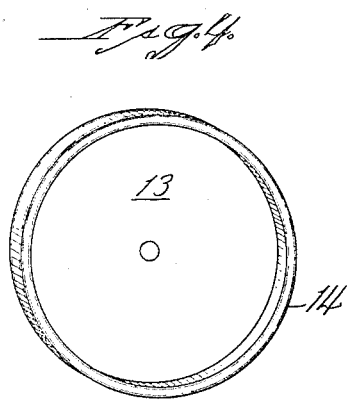
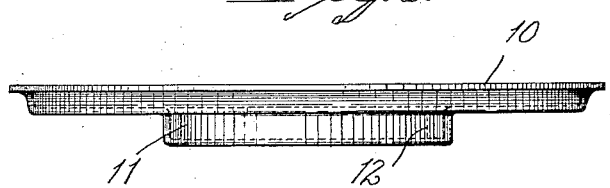

Patented Sept. 16, 1930

1,776,035

UNITED STATES PATENT OFFICE

FRANZ R. KUNATH, OF WEST HAVEN, CONNECTICUT

COVER FOR CULINARY UTENSILS

Application filed March 6, 1930. Serial No. 433,613.

This invention relates to an improvement in covers for culinary utensils, and particularly for pots, with special reference to pots used in steam cooking. In cooking with steam, it is common to provide a plate with a central opening adapted to set over the top of one pot and upon which a second pot may rest. The object of this invention is to so construct such rings or plates that a cap may be applied over the central opening so as to close the same and form a complete cover, and the invention consists in the construction as hereinafter described and particularly recited in the claim.

In the accompanying drawings:

Fig. 1 is a side view, partly in section, of two pots, one superimposed upon the other and showing my improved cover therefor;

Fig. 2 is a plan view of the plate or ring;

Fig. 3 is an edge view of the same; and

Fig. 4 is a perspective view of the cover-cap.

In carrying out my invention, I form a disk or plate 10 from sheet-metal with a central opening 11, the edge of the metal around said opening being struck downward and then turned upward, forming a vertically-arranged straight collar 12, and I provide a cap 13 formed with a straight, resilient flange 14 adapted to closely fit the collar 12 either inside or outside thereof, so as to firmly frictionally interlock therewith and thus provide a complete cover for a kettle 16. If the cooking is to be done by steam, one of the plates, without the cap, will be placed over the lower kettle 15, and a second kettle 16 placed upon the plate, and this second kettle will be provided with a cover consisting of a plate 10 and a cap 13. Thus, one vessel may be arranged upon the top of another one to any desired extent, the top one being provided with a closed cover, the cover-plates being the same or of smaller diameter, as may be required for different sizes of pots.

Preferably, whatever the diameter of the plates may be, the central openings will correspond, so that one cap or cover may be used with various sizes of plates.

These plates and covers are readily struck up from sheet-metal and may be sold separately or in sets, that is, two or more plates may be sold with a single cover.

I claim:

A culinary utensil comprising a plurality of flat-bottomed handled kettles differentiated in size; a complementary shallow tray-like plate for each kettle, having a flat upper surface and formed with a lip by which it is supported upon the edge of its complementary kettle and with a relatively-large centrally-located circular steam-outlet from the edge of which depends an upwardly-opening U-shaped channel, the steam-outlets and depending channels of the several plates being of the same diameter; and a supplemental cap-like cover adapted in size to fit into and seal the steam-outlets of all of the plates, whereby the flat top of any one plate is adapted to form a virtually steam-tight seat with the flat bottom of any kettle which may be set upon it when the supplemental cap-like cover is removed.

In testimony whereof, I have signed this specification.

FRANZ R. KUNATH.